United States Patent
Arslan et al.

(10) Patent No.: US 11,646,923 B2
(45) Date of Patent: May 9, 2023

(54) OFDM WITH HYBRID GAP AND INDEX MODULATION

(71) Applicant: Istanbul Medipol Universitesi, Istanbul (TR)

(72) Inventors: Hüseyin Arslan, Istanbul (TR); Ahmad Mohammad Abd-Alghani Jaradat, Istanbul (TR)

( * ) Notice: Subject to any disclaimer, the term of this patent is extended or adjusted under 35 U.S.C. 154(b) by 0 days.

(21) Appl. No.: 17/789,319

(22) PCT Filed: Dec. 2, 2020

(86) PCT No.: PCT/TR2020/051215
§ 371 (c)(1),
(2) Date: Jun. 27, 2022

(87) PCT Pub. No.: WO2021/137802
PCT Pub. Date: Jul. 8, 2021

(65) Prior Publication Data
US 2022/0368578 A1    Nov. 17, 2022

(30) Foreign Application Priority Data
Dec. 30, 2019 (TR) .................................. 2019/22359

(51) Int. Cl.
*H04L 27/26* (2006.01)
*H04L 5/00* (2006.01)
*H04L 27/30* (2006.01)

(52) U.S. Cl.
CPC ........ *H04L 27/2602* (2013.01); *H04L 5/0007* (2013.01); *H04L 5/0053* (2013.01); *H04L 27/2614* (2013.01); *H04L 27/30* (2013.01)

(58) Field of Classification Search
CPC ............. H04L 27/26025; H04L 27/263; H04L 27/2601; H04L 27/2614; H04L 27/2627
See application file for complete search history.

(56) References Cited

U.S. PATENT DOCUMENTS

2017/0180032 A1*  6/2017  Basar .................. H04B 7/0495

OTHER PUBLICATIONS

International Search Report for corresponding PCT/TR2020/051215 dated Mar. 31, 2021.
Written Opinion of the International Searching Authority for corresponding PCT/TR2020/051215 dated Mar. 31, 2021.
Mao et al. "Dual-Mode Index Modulation Aided OFDM," in IEEE Access, vol. 5, pp. 50-60, Feb. 20, 2017.
A. I. Siddiq, "Low Complexity OFDM-IM Detector by Encoding All Possible Subcarrier Activation Patterns," in IEEE Communications Letters, vol. 20, No. 3, pp. 446-449, Mar. 2016.
Jaradat et al. "OFDM With Hybrid Number and Index Modulation.", in IEEE Access, vol. 8, Mar. 19, 2020.

* cited by examiner

*Primary Examiner* — Kevin Kim
(74) *Attorney, Agent, or Firm* — Egbert, McDaniel & Swartz, PLLC

(57) ABSTRACT

A method based on orthogonal frequency division multiplexing (OFDM) called OFDM-subcarrier gap and index modulation (OFDM-SGIM) is proposed in which the gaps between the active subcarriers are exploited to transmit extra bits alongside the conventional QAM symbols. Thereafter, the index modulation is combined with the new proposed OFDM-based scheme to guarantee a fixed subblock size.

1 Claim, 1 Drawing Sheet

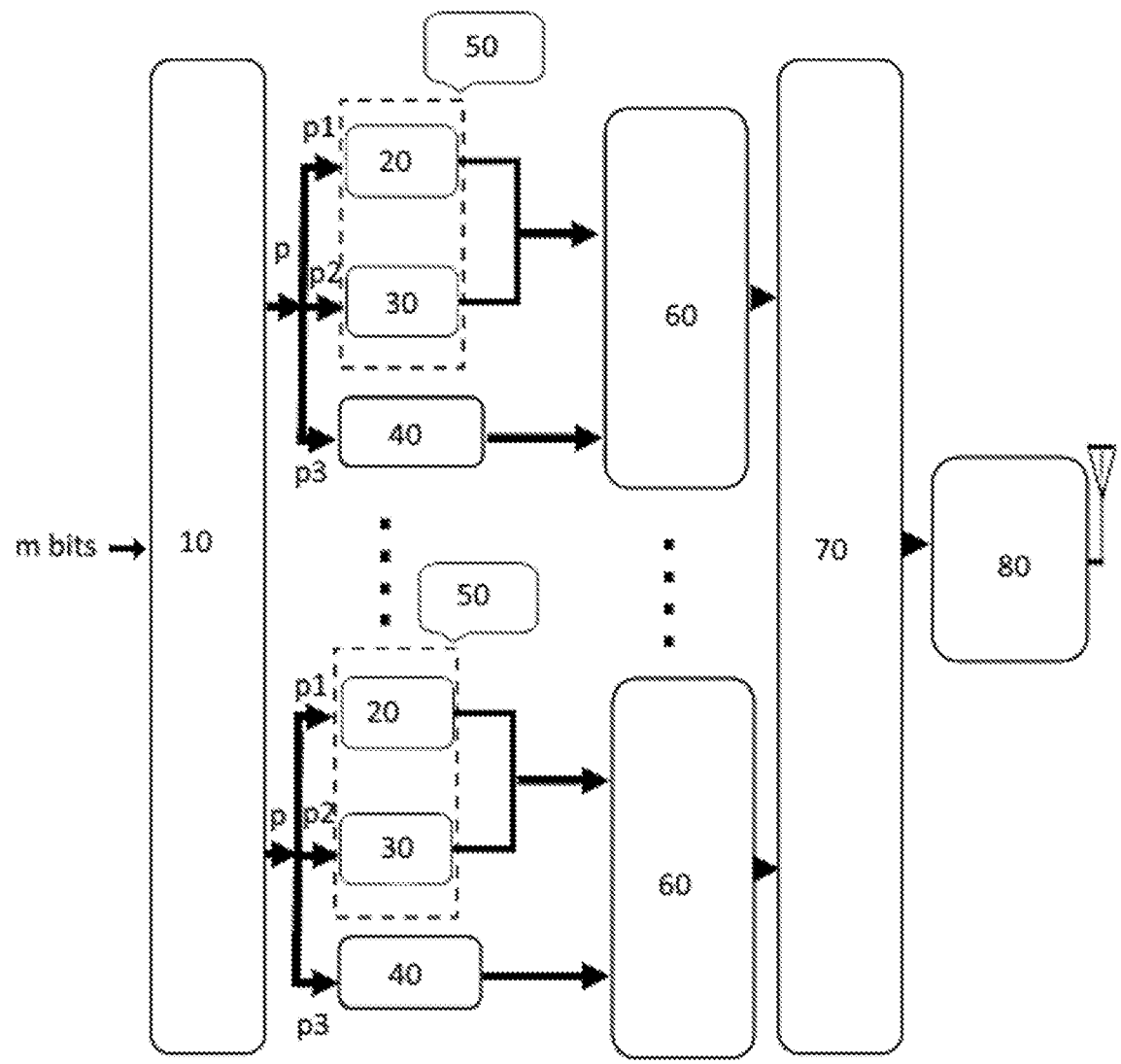

OFDM WITH HYBRID GAP AND INDEX MODULATION

TECHNICAL FIELD

The invention inspired by orthogonal frequency division multiplexing with subcarrier number modulation (OFDM-SNM) where width of subcarrier activation pattern (SAP) has been exploited to convey additional information, in the new proposed OFDM-based modulation scheme called OFDM with subcarrier gap modulation (OFDM-SGM) in which the interval (or the gaps) between the filled (active) subcarriers are exploited to transmit additional data bits alongside the conventional QAM symbols. Thereafter, the index modulation (IM) is combined with the new proposed OFDM-based scheme in order to guarantee a fixed subblock size (which avoids the case where the location of active subcarrier is fixed within a subblock)

PRIOR ART

Many of the current OFDM-based modulation options have their advantage and disadvantage but they could be fit to specific applications depending on the system requirements. The current OFDM modulation options don't consider the gap between the active subcarriers as an important dimension to transmit additional information bits besides the complex QAM symbols. Generally, the existing modulation schemes for OFDM waveform are coherent transmitting schemes in which subblock length is fixed, but the future communication system needs a flexible modulation option. Low-power devices will be part of our future life and robust power efficient modulation scheme is required As a result, due to the above-mentioned disadvantages and the inadequacy of the existing solutions, an improvement in the relevant technical field was required.

PURPOSE OF THE INVENTION

The invention aims to provide a method with different technical characteristics which brings a new perspective in this field, unlike the embodiments used in the present art.

Main purpose of the invention, to propose a new modulation scheme called OFDM-subcarrier gap and index modulation (OFDM-SGIM) in order to transmit extra data bits with the conventional QAM symbols.

The purpose of the invention, to propose the scheme OFDM-SGIM has the potential to reduce the peak-to-average power ratio (PAPR) of the current communication system by exploiting the gaps between the active subcarriers in the OFDM block.

Another purpose of the invention, the proposed scheme has the potential to have high spectral efficiency performance and some other performance improvements at the cost of losing some block resources due to different gaps between the active subcarriers. Therefore, the proposed scheme has the same properties as the existing OFDM modulation options in terms of its applicability to the future wireless communication systems.

The usage of the invention could be used for high spectrally efficient applications in the future generation networks. The future wireless communication networks require high spectral efficient systems. The OFDM-SGM could meet such a requirement by introducing new dimension, named gaps between the active subcarriers, to send extra information along with the conventional complex symbols. Due to conveying the data bits using the gap between active subcarriers as well as the index of those active subcarriers, the proposed OFDM-SGIM results in improved spectral efficiency (SE) performance as compared to the conventional OFDM.

The proposed OFDM-SGIM has potential to increase the spectral efficiency of the existing wireless communication system by adding degree of freedoms represented by the interval between the filled subcarriers and position of them.

Advantages and unique elements of the invention;
A new dimension called the gap between active subcarriers is introduced for transmitting additional information alongside the conventional QAM symbols.

The OFDM-SGIM improved over the conventional OFDM in terms of spectral efficiency (SE) by a factor of 1.6 assuming BPSK is employed.

Robust reliability performance is expected due less probable of having detection error in consecutive subcarriers thanks to the inherent features of the proposed OFDM-SGIM represented by the gaps between filled subcarriers.

Low peak-to-average-power ratio (PAPR) and out-of-band emission (OOBE) values are expected to be observed in the proposed OFDM-SGM-IM.

In order to fulfill the above-described purposes, the invention is a method for orthogonal frequency division multiplexing-subcarrier gap and index modulation (OFDM-SGIM) where width of subcarrier activation pattern (SAP) has been exploited to convey additional information characterized by comprising the steps of;

Partitioning the incoming bits to groups using bits splitter and each group contains $p=p1+p2+p3$ bits that utilized to build an OFDM subblock, Utilizing the p1 bits in each OFDM subblock by the gaps mapper to specify the gaps between the active OFDM subcarriers for each subblock, Exploiting the p2 bits, referred to IM bits, by the IM mapper to specify the active subcarriers indices for each OFDM subblock, Combining and feeding the resultant gap and IM mapping into the hybrid mapper which determines the subcarrier activation pattern (SAP) using a proper mapping technique, Sending the remaining p3 bits corresponding to specific conventional QAM symbols to the turned on subcarriers.

The structural and characteristic features and all advantages of the invention will become more apparent from the following FIGURES and the detailed description made with reference to these FIGURES, and therefore the evaluation should be made with reference to these FIGURES and detailed description.

BRIEF DESCRIPTION OF THE FIGURES

FIG. 1, block diagram of the transmitter structure of the proposed OFDM-SGIM.

The drawings do not necessarily have to be scaled and details which are not necessary to understand the present invention may be omitted. Furthermore, elements which are at least substantially identical or at least substantially identical functions are designated by the same number.

REFERENCE LIST

10. Bits splitter
20. Gap mapper
30. IM mapper

40. M-ary modulation
50. Hybrid mapper
60. Secondary sub-block creator
70. Primary OFDM block creator
80. Conventional OFDM modulator (IFFT+CP+DAC)

ABBREVIATION LIST

OFDM: orthogonal frequency division multiplexing
OFDM-SNM: orthogonal frequency division multiplexing with subcarrier number modulation
SAP: subcarrier activation pattern
OFDM-SGM: orthogonal frequency division multiplexing with subcarrier gap modulation
OFDM-SGIM: orthogonal frequency division multiplexing-subcarrier gap and index modulation
IM: index modulation
QAM: Quadrature amplitude modulation
SE: spectral efficiency
BPSK: Binary phase shift keying

DETAILED DESCRIPTION OF THE INVENTION

In this detailed description, preferred embodiments of the invention are explained for better understanding of the subject matter and with no limiting effect.

The invention inspired by orthogonal frequency division multiplexing with subcarrier number modulation (OFDM-SNM) where width of subcarrier activation pattern (SAP) has been exploited to convey additional information, in the new proposed OFDM-based modulation scheme called OFDM with subcarrier gap modulation (OFDM-SGM) in which the interval (or the gaps) between the filled (active) subcarriers are exploited to transmit additional data bits alongside the conventional QAM symbols. Thereafter, the index modulation (IM) is combined with the new proposed OFDM scheme in order to guarantee a fixed subblock size.

In order to transmit as much as possible of data bits using the proposed OFDM interval modulation, we can transmit lower order modulation when more interval (or gap) presents (i.e., more power) and higher order modulation when less interval (gap) presents (i.e., less power). The following Table I shows an example of the criteria used for determining the gaps between the active OFDM subcarriers for each subblock. The following Table I shows the mapping between the incoming information bits to SAP in the OFDM interval modulation, where the number of gaps between active subcarriers carry additional information, for example, when the incoming information bits are [0 0] then there would be no gap between the occupied subcarriers, so SAP has three possible patterns assuming a subblock length of 4: [0 1 1 0], [1 1 0 0], and [0 0 1 1]. Two, three, and four gaps between the filled subcarriers for the input bits [0 1], [1 0], and [1 1].

TABLE I

The mapping table for the proposed OFDM-SGM.

| Incoming bits | SAP |
| --- | --- |
| 0 0 | 0110, 1100, 0011 |
| 0 1 | 0101, 1010 |
| 1 0 | 1001 |
| 1 1 | 10001 |

Another implementation of OFDM subcarrier gap modulation (OFDM-SGM) is its combination with the index modulation (IM) where the gaps as well as the indices of the active subcarriers embed extra information alongside the conventional QAM symbols. The general critieria for IM have been already defined in the literature, and we give an example of such criteria as shown in Table II. Table II shows an example of proper mapping technique used in the proposed scheme. There could be other proper mapping techniques, but, for the sake of simplicity and clarity, we provide an example of a proper technique as shown in Table II. The following Table II shows a proper mapping technique, for example the mapping between the incoming information bits to their corresponding SAPs in the OFDM-subcarrier gap and index modulation (OFDM-SGIM). It is assumed that the interval bits (p1) have fixed length of 2 and variable length of the index bits (p2) according to p1. For example, the SAP of [1100] results from the p1 bits of [00] where no gap between the active subcarriers and their positions are controlled by the p2 of [00] which refers to the position 1 and 2.

TABLE II

The mapping table for the proposed OFDM-SGIM.

| Interval bits ($p_1$) | Index bits ($p_2$) | SAP |
| --- | --- | --- |
| 00 | 00 | 1100 |
|  | 01 | 0110 |
|  | 10 | 0011 |
| 01 | 0 | 0101 |
|  | 1 | 1010 |
| 10 | 0 | 1001 |
|  | 1 | 01001 |
| 11 | 0 | 10001 |
|  | 1 | 010001 |

The spectral efficiency (SE) gain of OFDM-SGIM over the conventional OFDM assuming BPSK is employed, equals to 48/30=1.6.

The block diagram of the proposed OFDM-SGIM scheme is shown in FIG. 1. Them incoming bits are partitioned to G groups using bits splitter (10), each group contains p=p1+p2+p3 bits, that utilized to build an OFDM subblock of L subcarriers length (L=NF/G), where NF represents FFT size. The p1 bits in each OFDM subblock, is called gap bits which are utilized by the gaps mapper (20) to specify the gaps between the active OFDM subcarriers for each subblock. The p2 bits, referred to IM bits, are exploited by the IM mapper (30) to specify the active subcarriers' indices for each OFDM subblock. Then, the resultant gap and IM mapping are combined and fed into the hybrid mapper (50) which determines the subcarrier activation pattern (SAP) using a proper mapping technique, for example, as shown in Table II where it is assumed that p1=2 and L=4. The remaining p3 bits corresponding to specific conventional QAM symbols would be sent over the turned on subcarriers.

The invention claimed is:
1. A method for orthogonal frequency division multiplexing with subcarrier gap and index modulation (OFDM-SGIM) exploits gaps between active subcarriers to transmit extra bits alongside conventional QAM symbols and index modulation (IM) is combined with a new proposed OFDM-based scheme to guarantee a fixed subblock size, the method comprising the following steps:
    partitioning incoming bits to groups using a bits splitter and each group contains p=p1+p2+p3 bits that are utilized to build an OFDM subblock, utilizing the p1 bits in each OFDM subblock by a gaps mapper to specify the gaps between the active OFDM subcarriers for each subblock, exploiting the p2 bits, referred to IM bits, by an IM mapper to specify the active subcarriers indices for each OFDM subblock, combining and feeding the resultant gap and IM mapping into a hybrid mapper which determines the subcarrier activation pattern (SAP) using a proper mapping technique, sending the remaining p3 bits corresponding to specific conventional QAM symbols to the turned on subcarriers.

\* \* \* \* \*